United States Patent
Chen et al.

(10) Patent No.: US 9,312,072 B2
(45) Date of Patent: Apr. 12, 2016

(54) WINDING-TYPE SOLID ELECTROLYTIC CAPACITOR PACKAGE STRUCTURE USING A CARRIER BOARD AND METHOD OF MANUFACTURING THE SAME

(71) Applicant: APAQ TECHNOLOGY CO., LTD., Miaoli County (TW)

(72) Inventors: Ming-Tsung Chen, Changhua County (TW); Ching-Feng Lin, Hsinchu County (TW)

(73) Assignee: Apaq Technology Co., Ltd., Miaoli County (TW)

( * ) Notice: Subject to any disclaimer, the term of this patent is extended or adjusted under 35 U.S.C. 154(b) by 625 days.

(21) Appl. No.: 13/845,175

(22) Filed: Mar. 18, 2013

(65) Prior Publication Data

US 2014/0262459 A1 Sep. 18, 2014

(51) Int. Cl.
*H01G 9/00* (2006.01)
*H01G 9/012* (2006.01)
*H01G 9/15* (2006.01)
*H01G 13/00* (2013.01)

(52) U.S. Cl.
CPC ............. *H01G 9/0029* (2013.01); *H01G 9/012* (2013.01); *H01G 9/151* (2013.01); *H01G 13/006* (2013.01); *Y10T 29/417* (2015.01)

(58) Field of Classification Search
CPC ......... H01G 9/012; H01G 9/10; H01G 9/016; H01G 9/0029; H01G 9/151; H01G 9/008
USPC .................. 361/523, 516–519, 525, 528–529
See application file for complete search history.

(56) References Cited

U.S. PATENT DOCUMENTS

| | | | | |
|---|---|---|---|---|
| 7,095,605 B2* | 8/2006 | Suenaga | ................ | H01G 2/065 29/25.03 |
| 7,248,460 B2* | 7/2007 | Omura | ..................... | H01G 9/10 361/502 |
| 8,164,882 B2* | 4/2012 | Sakata | ..................... | H01G 9/12 361/516 |
| 8,320,104 B2* | 11/2012 | Fujimoto | ............... | H01G 9/012 361/511 |
| 8,837,115 B2* | 9/2014 | Ishida | ................... | H01G 9/012 361/520 |
| 9,070,513 B2* | 6/2015 | Lee | ........................ | H01G 9/016 |

* cited by examiner

*Primary Examiner* — Nguyen T Ha
(74) *Attorney, Agent, or Firm* — Rosenberg, Klein & Lee

(57) ABSTRACT

A winding-type solid electrolytic capacitor package structure includes a substrate body, a winding capacitor, a package body and an electrode unit. The winding capacitor has a winding body, a positive conductive lead pin having a positive end surface, and a negative conductive lead pin having a negative end surface. The package body is disposed on the substrate body to enclose the winding body, and the package body has a first lateral surface substantially flushed with the positive end surface and a second lateral surface substantially flushed with the negative end surface. The electrode unit includes a positive electrode structure for covering the first lateral surface and electrically contacting the positive end surface and a negative electrode structure for covering the second lateral surface and electrically contacting the negative end surface.

12 Claims, 9 Drawing Sheets

WINDING-TYPE SOLID ELECTROLYTIC CAPACITOR PACKAGE STRUCTURE USING A CARRIER BOARD AND METHOD OF MANUFACTURING THE SAME

BACKGROUND OF THE INVENTION

1. Field of the Invention

The instant disclosure relates to a solid electrolytic capacitor package structure and a method of manufacturing the same, and more particularly to a winding-type solid electrolytic capacitor package structure using a carrier board and a method of manufacturing the same.

2. Description of Related Art

The winding-type capacitor includes a capacitor core, a casing, and a sealing cover. The capacitor core has an anode foil coupled to an anode terminal, a cathode foil coupled to a cathode terminal, a separator, and an electrolyte layer. The anode foil, the cathode foil and the separator are rolled together. The separator is disposed between the anode foil and the cathode foil. The electrolyte layer is formed between the anode foil and the cathode foil. The casing has an opening for receiving the capacitor core. The sealing cover can used to seal the casing, and the anode terminal and the cathode terminal can pass through a through hole of the sealing cover. A given space is provided between the sealing cover and the capacitor core. A stopper for securing the space is provided on at least one of the anode terminal and the cathode terminal. However, there is no any other package body for enclosing the winding-type capacitor in the prior art.

SUMMARY OF THE INVENTION

One aspect of the instant disclosure relates to a winding-type solid electrolytic capacitor package structure using a carrier board and a method of manufacturing the same.

One of the embodiments of the instant disclosure provides a winding-type solid electrolytic capacitor package structure using a carrier board, comprising: a substrate unit, a capacitor unit, a package unit and an electrode unit. The substrate unit includes a substrate body. The capacitor unit includes at least one winding capacitor, wherein the at least one winding capacitor has a winding body, a positive conductive lead pin extended from a first lateral side of the winding body, and a negative conductive lead pin extended from a second lateral side of the winding body, the positive conductive lead pin has a positive end surface, and the negative conductive lead pin has a negative end surface. The package unit includes a package body disposed on the substrate body to enclose the winding body, wherein the package body has a first lateral surface substantially flushed with the positive end surface and a second lateral surface opposite to the first lateral surface and substantially flushed with the negative end surface. The electrode unit includes a positive electrode structure covering the first lateral surface of the package body and electrically contacting the positive end surface of the positive conductive lead pin and a negative electrode structure covering the second lateral surface of the package body and electrically contacting the negative end surface of the negative conductive lead pin.

Another one of the embodiments of the instant disclosure provides a method of manufacturing a winding-type solid electrolytic capacitor package structure using a carrier board, comprising: providing a carrier body; placing a plurality of winding capacitors on the carrier body, wherein each winding capacitor has a winding body, a positive conductive lead pin extended from a first lateral side of the winding body, and a negative conductive lead pin extended from a second lateral side of the winding body, the positive conductive lead pin of each winding capacitor has a positive end surface, and the negative conductive lead pin of each winding capacitor has a negative end surface; forming a package material on the carrier body to enclose the winding capacitors; cutting the carrier body and the package material to separate the winding capacitors from each other, wherein the carrier body is cut into a plurality of substrate bodies for respectively carrying the winding capacitors, the package material is cut into a plurality of package bodies to respectively enclose the winding bodies of the winding capacitors, and each package body has a first lateral surface substantially flushed with the positive end surface of the corresponding winding capacitor and a second lateral surface opposite to the first lateral surface and substantially flushed with the negative end surface of the corresponding winding capacitor; and then forming a positive electrode structure to cover the first lateral surface of the package body and electrically contact the positive end surface of the positive conductive lead pin and forming a negative electrode structure to cover the second lateral surface of the package body and electrically contact the negative end surface of the negative conductive lead pin.

More precisely, before the step of placing the winding capacitors on the carrier body, the method further comprises: pressing the winding body of each winding capacitor from a cylinder into a cuboid, wherein each winding capacitor includes a positive soldering foot soldered on an end of the positive conductive lead pin and a negative soldering foot soldered on an end of the negative conductive lead pin; removing the negative soldering foot of each winding capacitor by cutting; soldering the positive soldering foot of each winding capacitor on a connection bar; processing the winding capacitors by a carbonization process, a formation process and a polymer-impregnated process in sequence; removing polymer that has been formed on an end portion of the negative conductive lead pin of each winding capacitor; and then removing the positive soldering foot of each winding capacitor by cutting.

More precisely, the winding body of each winding capacitor is adhered to the top surface of the carrier body through at least one adhesive body in the step of placing the winding capacitors on the carrier body.

More precisely, the winding body has a positive foil sheet, a negative foil sheet and an isolation paper disposed between the positive foil sheet and the negative foil sheet, the positive foil sheet, the negative foil sheet and the isolation paper are rolled to form a cuboid capacitor core, and the positive conductive lead pin and the negative conductive lead pin respectively electrically contact the positive foil sheet and the negative foil sheet.

More precisely, the positive conductive lead pin has a first positive conductive portion inserted into the winding body and electrically contacting the positive foil sheet and a second positive conductive portion connected to the first positive conductive portion and extended and exposed from the winding body, and the negative conductive lead pin has a first negative conductive portion inserted into the winding body and electrically contacting the negative foil sheet and a second negative conductive portion connected to the first negative conductive portion and extended and exposed from the winding body, wherein the positive electrode structure is extended from the first lateral surface of the package body to the top surface of the package body and the bottom surface of the substrate body, and the negative electrode structure is extended from the second lateral surface of the package body to the top surface of the package body and the bottom surface of the substrate body.

More precisely, the positive electrode structure includes a first positive conductive layer covering the first lateral surface of the package body and electrically contacting the positive end surface of the positive conductive lead pin, a second positive conductive layer covering the first positive conductive layer, and a third positive conductive layer covering the second positive conductive layer, wherein the negative electrode structure includes a first negative conductive layer covering the second lateral surface of the package body and electrically contacting the negative end surface of the negative conductive lead pin, a second negative conductive layer covering the first negative conductive layer, and a third negative conductive layer covering the second negative conductive layer, wherein both the first positive conductive layer and the first negative conductive layer are Ag layers, both the second positive conductive layer and the second negative conductive layer are Ni layers, and both the third positive conductive layer and the third negative conductive layer are Sn layers.

Therefore, the package body has a first lateral surface substantially flushed with the positive end surface and a second lateral surface substantially flushed with the negative end surface, and the electrode unit includes a positive electrode structure covering the first lateral surface of the package body and a negative electrode structure covering the second lateral surface of the package body, thus the winding-type solid electrolytic capacitor package structure of the instant disclosure can be manufactured without using any lead frame for decreasing the manufacturing cost and increasing the manufacturing speed (i.e., the production quantity) and the production yield rate.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 1:
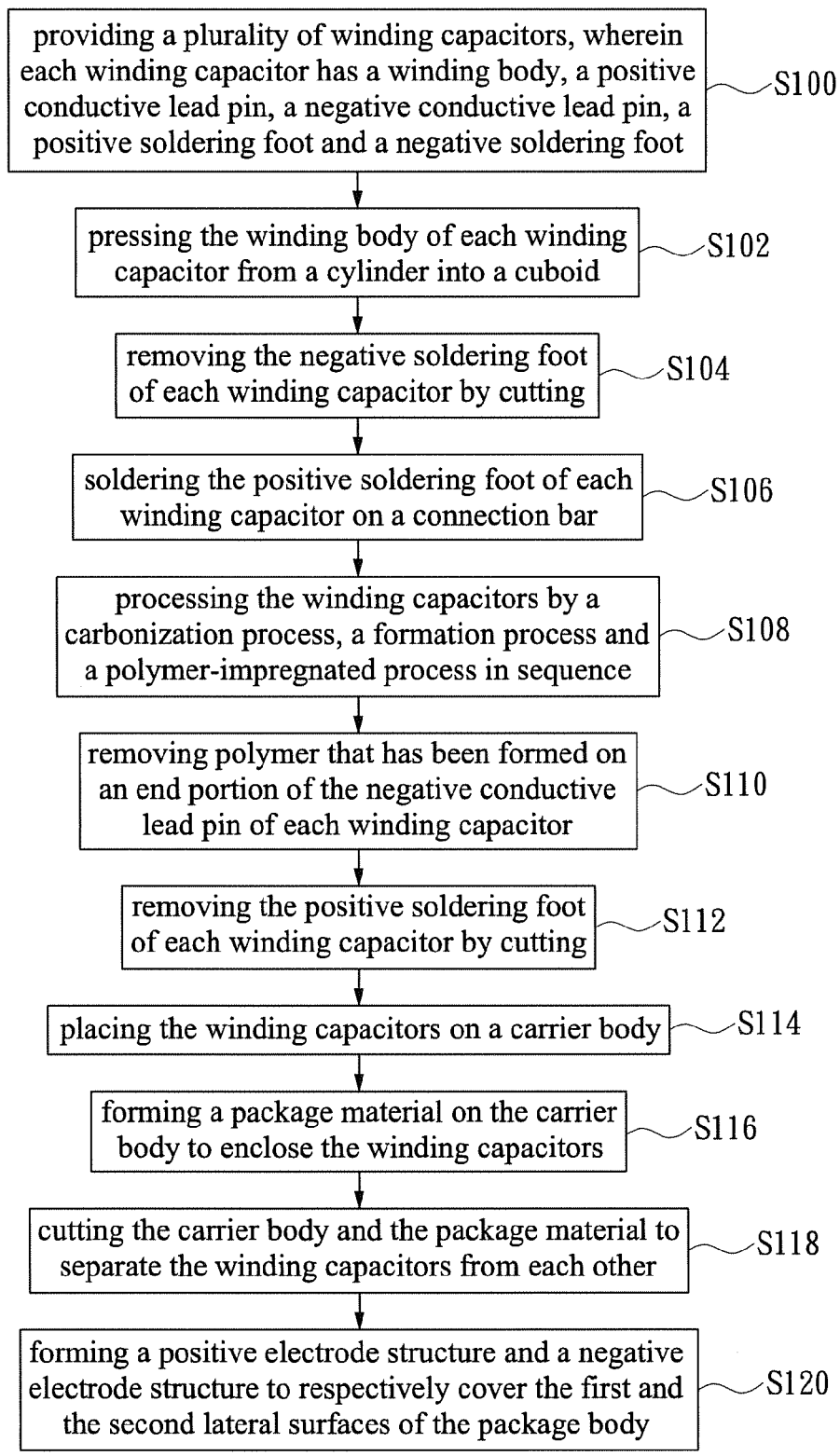
FIG. 1 shows a flowchart of the method of manufacturing a winding-type solid electrolytic capacitor package structure using a carrier board according to the instant disclosure.
Figure 2:
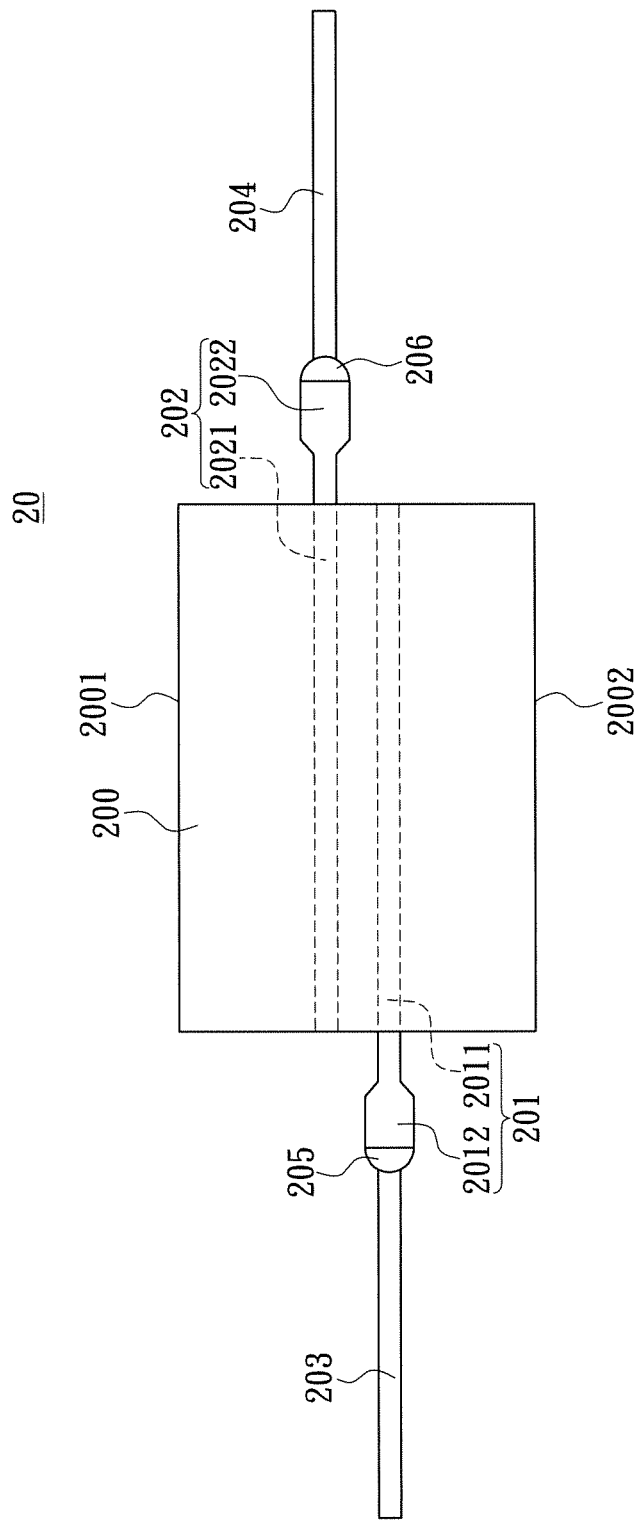
FIG. 2 shows a lateral, schematic view of the winding capacitor according to the instant disclosure.
Figure 3:
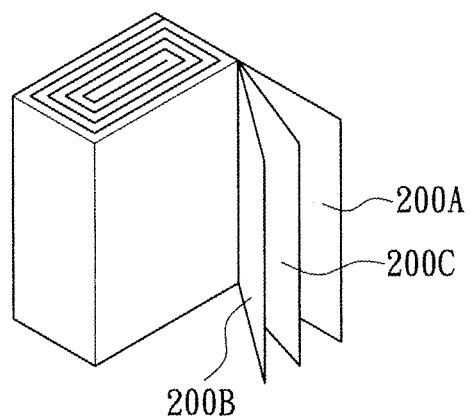
FIG. 3 shows a perspective, schematic view of the winding body of the winding capacitor according to the instant disclosure.
Figure 4:
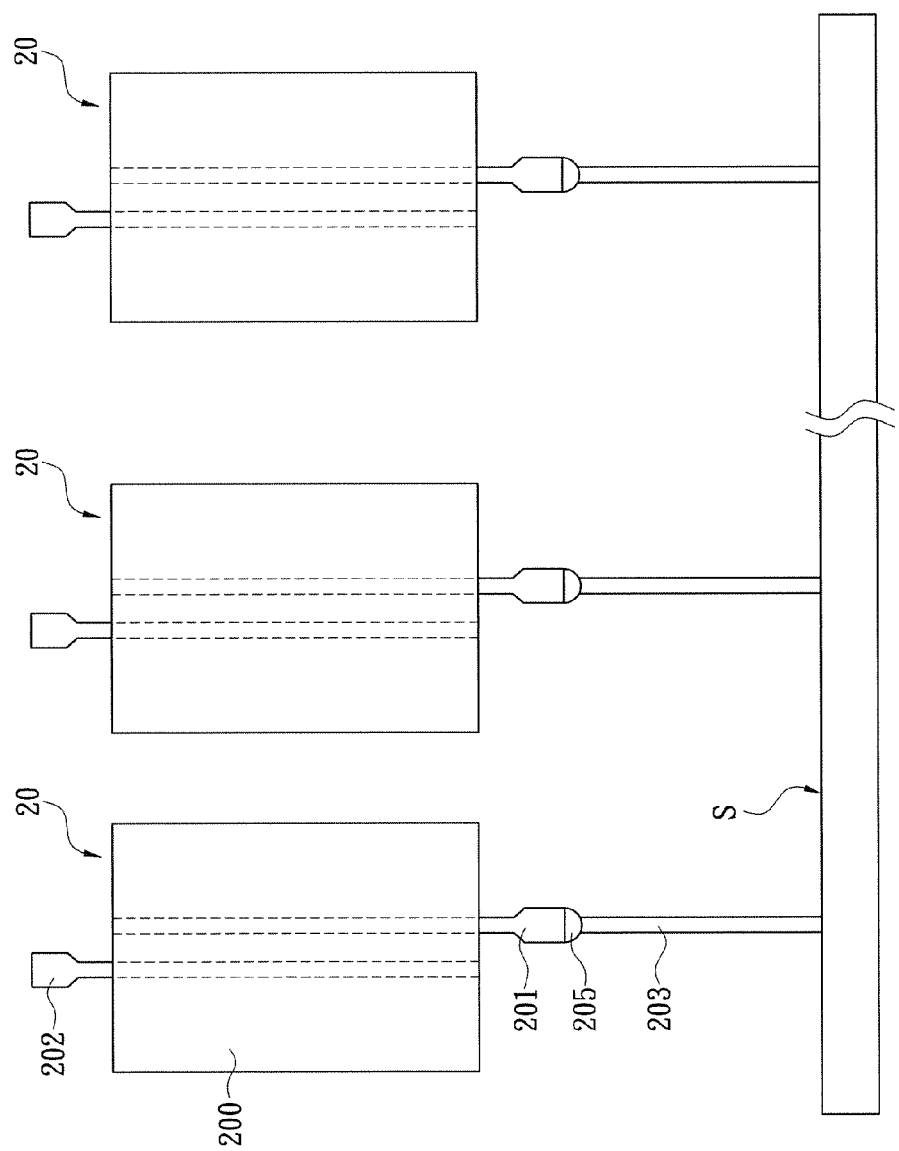
FIG. 4 shows a lateral, schematic view of soldering the positive soldering foot of each winding capacitor on the connection bar according to the instant disclosure.
Figure 5:
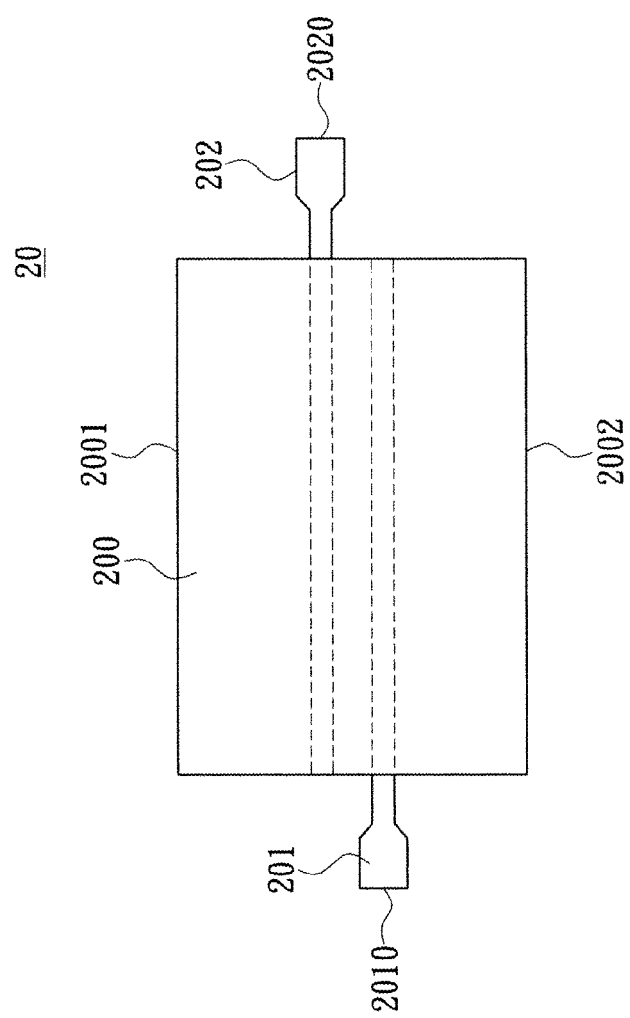
FIG. 5 shows a lateral, schematic view of removing the positive soldering foot and the negative soldering foot of the winding capacitor according to the instant disclosure.
Figure 6:
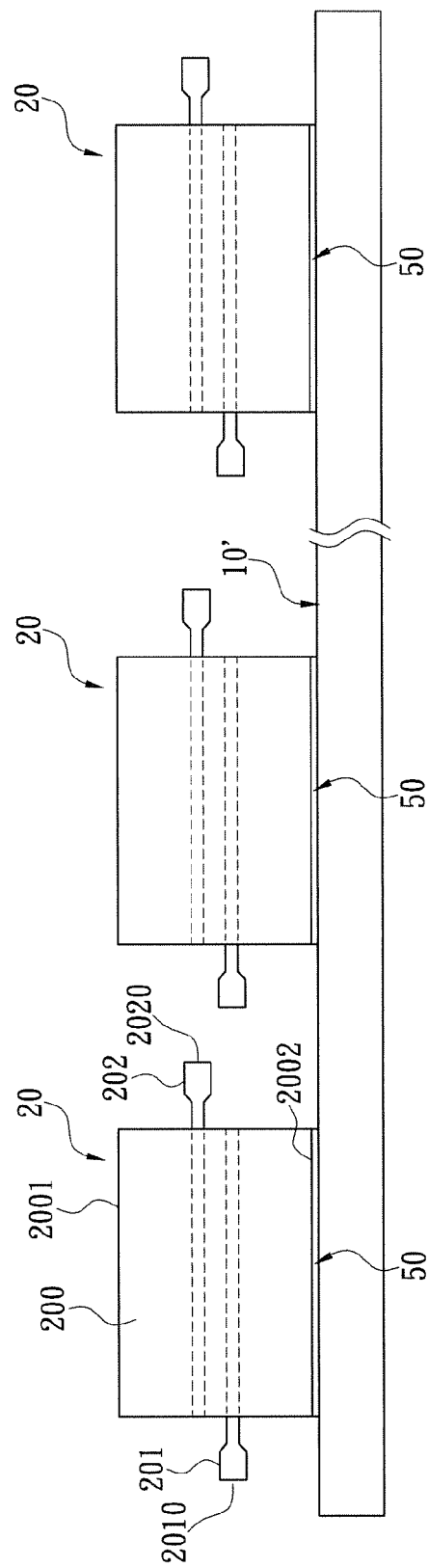
FIG. 6 shows a lateral, schematic view of placing the winding capacitors on the substrate body according to the instant disclosure.
Figure 7:
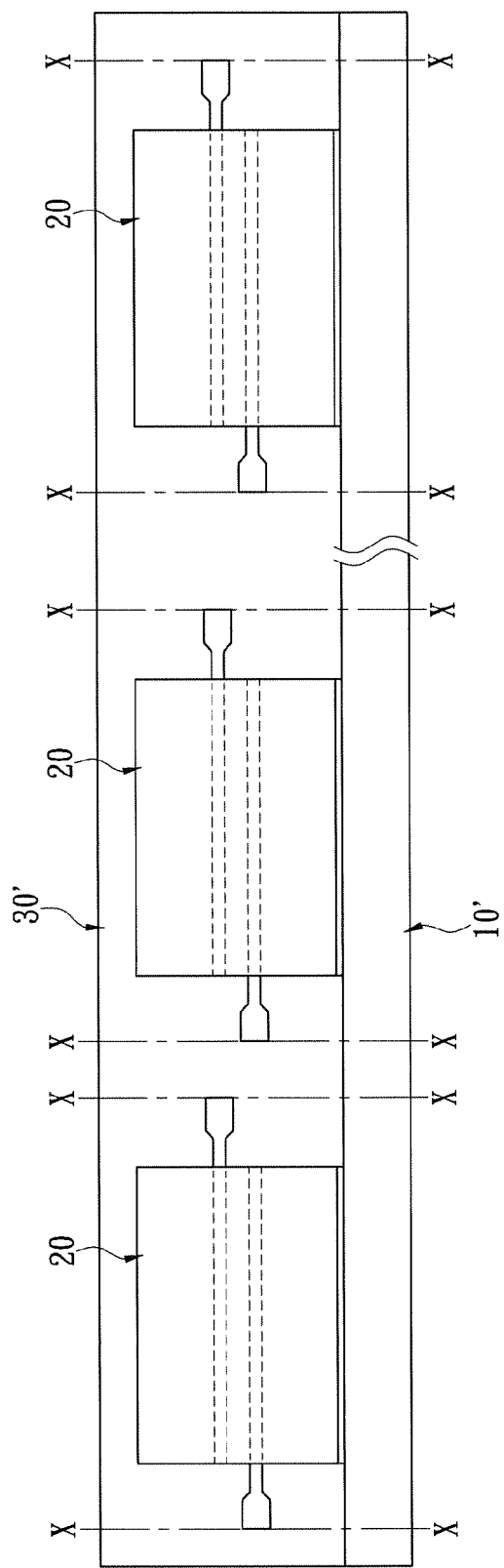
FIG. 7 shows a lateral, schematic view of enclosing the winding capacitors by the package material according to the instant disclosure.
Figure 8:
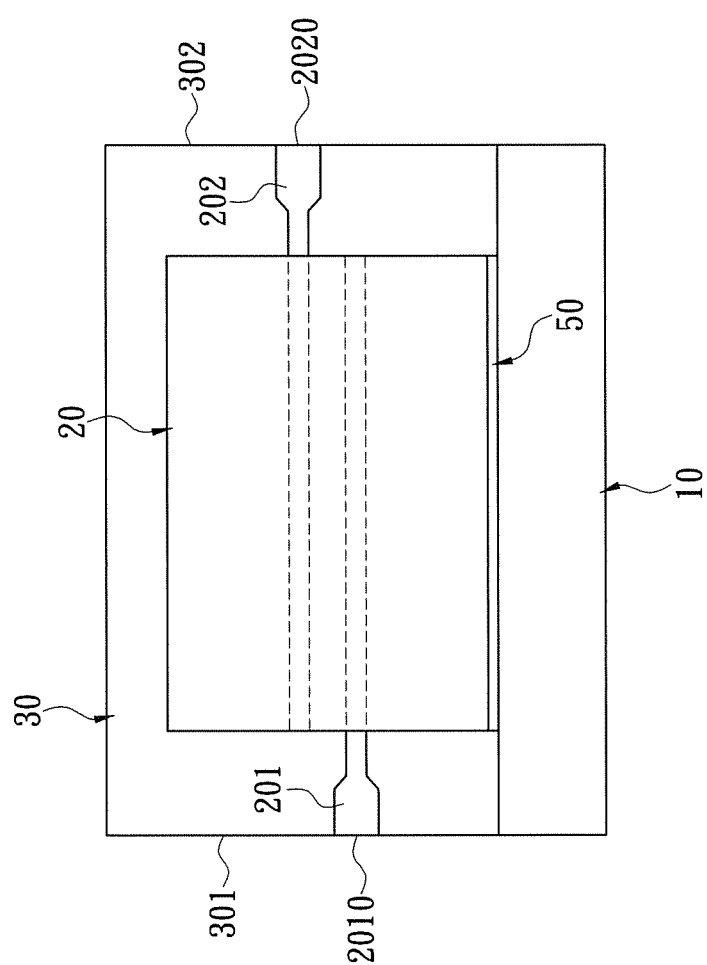
FIG. 8 shows a lateral, schematic view of the method of the step S118 according to the instant disclosure.
Figure 9:
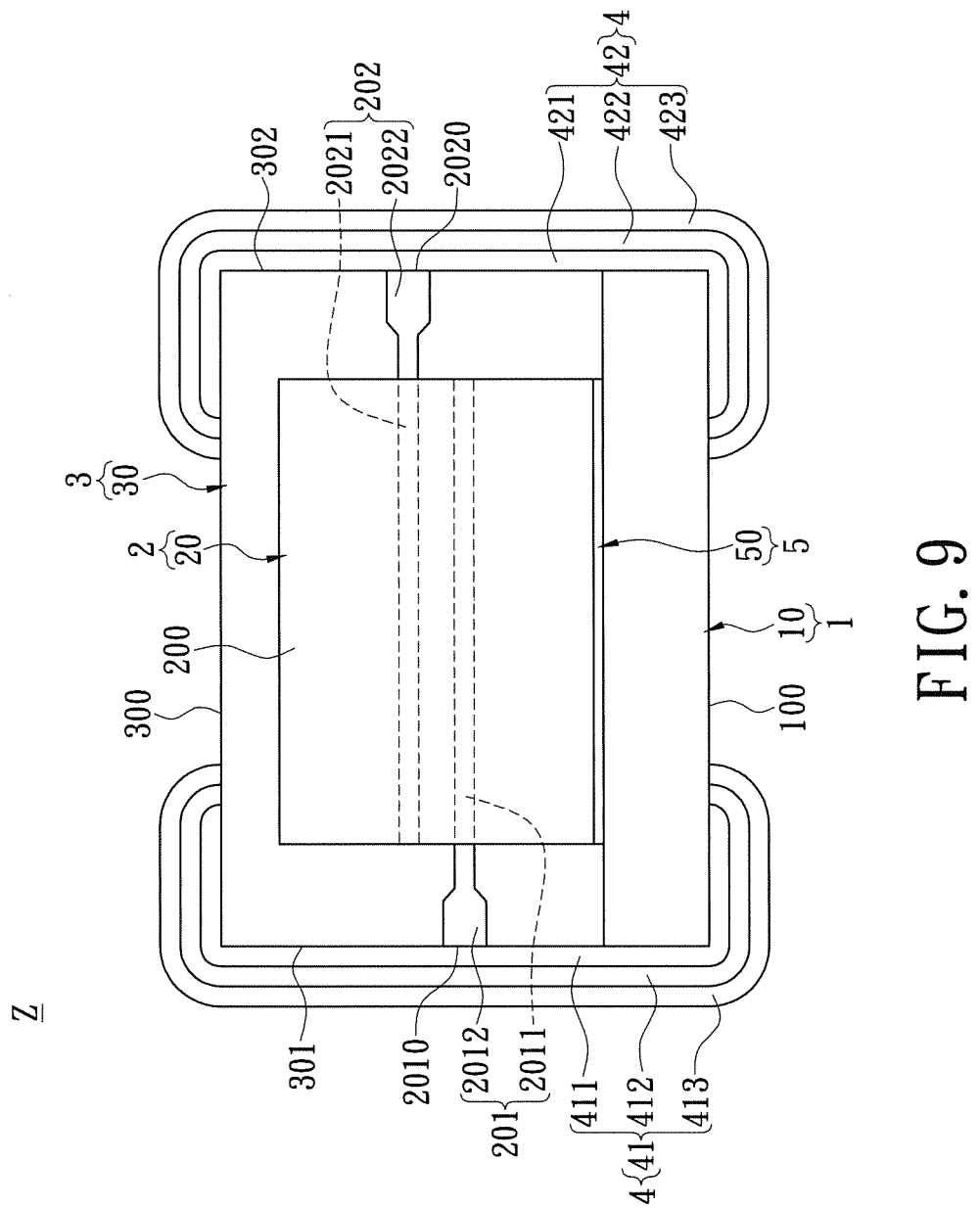
FIG. 9 shows a lateral, schematic view of the winding-type solid electrolytic capacitor package structure using a carrier board according to the instant disclosure.

Referring to FIG. 1 to FIG. 9, where FIG. 1 shows a flowchart of the method of manufacturing a winding-type solid electrolytic capacitor package structure, FIG. 2 shows a lateral, schematic view of the winding capacitor, FIG. 3 shows a perspective, schematic view of the winding body of the winding capacitor, FIG. 4 shows a lateral, schematic view of soldering the positive soldering foot of each winding capacitor on the connection bar, FIG. 5 shows a lateral, schematic view of removing the positive soldering foot and the negative soldering foot of the winding capacitor, FIG. 6 shows a lateral, schematic view of placing the winding capacitors on the substrate body, FIG. 7 shows a lateral, schematic view of enclosing the winding capacitors by the package material, FIG. 8 shows a lateral, schematic view of the method of the step S118, and FIG. 9 shows a lateral, schematic view of the winding-type solid electrolytic capacitor package structure. The instant disclosure provides a method of manufacturing a winding-type solid electrolytic capacitor package structure Z using a carrier board, comprising the following steps:

First, referring to FIG. 1 and FIG. 2, the step S100 is that: providing a plurality of winding capacitors 20, wherein each winding capacitor 20 has a winding body 200, a positive conductive lead pin 201 extended from a first lateral side of the winding body 200, a negative conductive lead pin 202 extended from a second lateral side of the winding body 200, a positive soldering foot 203 soldered on an end of the positive conductive lead pin 201, and a negative soldering foot 204 soldered on an end of the negative conductive lead pin 202. More precisely, the positive conductive lead pin 201 and the negative conductive lead pin 202 are respectively extended from two opposite lateral sides of the winding body 200. In addition, the positive soldering foot 203 can be soldered on the end of the positive conductive lead pin 201 through a first soldering point 205, and the negative soldering foot 204 can be soldered on the end of the negative conductive lead pin 202 through a second soldering point 206.

For example, both the positive conductive lead pin 201 and the negative conductive lead pin 202 can be made of a pure Al (aluminum) material or an Al alloy material, the positive soldering foot 203 may be a first multilayer structure composed of a plurality of first material layers (not shown), and the negative soldering foot 204 may be a second multilayer structure composed of a plurality of second material layers (not shown). In addition, the innermost first material layer and the inner most second material layer are two Fe (ferrum) layers or two Cu (copper) layers, and the outermost first material layer and the outermost second material layer are two Sn (Stannum) layers respectively surrounding the two Fe layers or the two Cu layers. However, the above-mentioned design for the winding capacitors 20 is merely an example and is not meant to limit the instant disclosure.

Next, referring to FIG. 1, FIG. 2 and FIG. 3, the step S102 is that: pressing the winding body 200 of each winding capacitor 20 from a cylinder into a cuboid such as a rectangular prism. In other words, the shape of the winding body 200 can be changed from the cylinder into the cuboid by pressing. Hence, the winding body 200 of each winding capacitor 20 has a plane top surface 2001 and a plane bottom surface 2002 formed by pressing, and the plane top surface 2001 and the plane bottom surface 2002 are opposite to each other. More precisely, the method of the instant disclosure further comprises: heating the winding body 200 of each winding capacitor 20 at a temperature about 50° C.~300° C. in or before the step of pressing the winding body 200 of each winding capacitor 20.

For example, referring to FIG. 2 and FIG. 3, the winding body 200 has a positive foil sheet 200A, a negative foil sheet 200B and an isolation paper 200C disposed between the positive foil sheet 200A and the negative foil sheet 200C, and the positive foil sheet 200A, the negative foil sheet 200B and the isolation paper 200C can be rolled and pressed to form a cuboid capacitor core. In addition, the positive conductive lead pin 201 and the negative conductive lead pin 202 can respectively electrically contact the positive foil sheet 200A and the negative foil sheet 200B. Moreover, the positive conductive lead pin 201 has a first positive conductive portion 2011 inserted into the winding body 200 and electrically contacting the positive foil sheet 200A and a second positive conductive portion 2012 integrally connected to the first positive conductive portion 2011 and extended and exposed from the winding body 200. And, the negative conductive lead pin 202 has a first negative conductive portion 2021 inserted into the winding body 200 and electrically contacting the negative foil sheet 200B and a second negative conductive portion 2022 integrally connected to the first negative conductive portion 2021 and extended and exposed from the winding body 200. In addition, both the length (shown as the dotted line in FIG. 2) of the first positive conductive portion 2011 that has been inserted into the winding body 200 and the length (shown as the dotted line in FIG. 2) of the first negative conductive portion 2021 that has been inserted into the winding body 200 are substantially the same as the width of the winding body 200. More precisely, the method of manufacturing the cuboid capacitor core further includes: rolling the positive foil sheet 200A, the negative foil sheet 200B and the isolation paper 200C to form a cylinder capacitor core (not shown), and then pressing the cylinder capacitor core to form a cuboid capacitor core (as shown in FIG. 3) at a temperature about 50° C.~300° C.

Then, referring to FIG. 1, FIG. 2 and FIG. 4, the method of the instant disclosure further comprises: removing the negative soldering foot 204 of each winding capacitor 20 by cutting (the step S104) and removing the second soldering point 206 (as shown in FIG. 4, the negative conductive lead pin 202 is still remained on the winding body 200), soldering the positive soldering foot 203 of each winding capacitor 20 on a connection bar S (the step S106), and then processing the winding capacitors 20 by a carbonization process, a formation process and a polymer-impregnated process in sequence (the step S108). In addition, both the carbonization process and the formation process can be repeatedly proceeded for increasing the production yield rate.

Afterward, referring to FIG. 1, FIG. 4 and FIG. 5, the method of the instant disclosure further comprises: removing polymer that has been formed on an end portion of the negative conductive lead pin 202 of each winding capacitor 20 (the step S110), and then removing the positive soldering foot 203 of each winding capacitor 20 by cutting (the step S112) and removing the first soldering point 205 (as shown in FIG. 5, the positive conductive lead pin 201 is still remained on the winding body 200). More precisely, the method of the instant disclosure further comprises: fixing the winding body 200 of each winding capacitor 20 through a clamping apparatus (not shown) before the step of removing the polymer that has been formed on the end portion of the negative conductive lead pin 202 of each winding capacitor 20. Hence, the clamping apparatus can be used to prevent the winding capacitors 20 from being shaken or swayed, thus it is convenient to remove the polymer by using the clamping apparatus. In addition, because the positive soldering foot 203 and the first soldering point 205 of each winding capacitor 20 can be removed by cutting, the positive conductive lead pin 201 has a cutting surface formed on an end of the positive conductive lead pin 201. And, because the polymer that has been formed on the end portion of the negative conductive lead pin 202 of each winding capacitor 20 can be removed by grinding, scraping or sandblasting etc., the negative conductive lead pin 202 has a grinding surface, a scraping surface, or a sandblasting surface etc. formed on the end portion of the negative conductive lead pin 202 by grinding, scraping or sandblasting etc. for increasing the soldering yield rate and the equivalent series resistance (ESR).

However, the above-mentioned method from the step S100 to the step S112 is merely an example and is not meant to limit the instant disclosure.

Subsequently, referring to FIG. 1, FIG. 5 and FIG. 6, the step S114 is that: placing the winding capacitors 20 on a carrier body 10'. In addition, the positive conductive lead pin 201 of each winding capacitor 20 has a positive end surface 2010, and the negative conductive lead pin 202 of each winding capacitor 20 has a negative end surface 2020. More precisely, because the second negative conductive portion 2022 is formed on the winding capacitor 20 by pressing, the winding body 200 of each winding capacitor 20 can be adhered to the top surface of the carrier body 10' through at least one adhesive body 50 in the step of placing the winding capacitors 20 on the carrier body 10'.

Next, referring to FIG. 1, FIG. 6 and FIG. 7, the step S116 is that: forming a package material 30' on the carrier body 10' to enclose the winding capacitors 20. More precisely, the winding capacitors can be processed by an ageing process after the step S116 of forming the package material 30' on the carrier body 10' to enclose the winding capacitors 20.

Then, referring to FIG. 1, FIG. 7 and FIG. 8, the step S118 is that: cutting the carrier body 10' and the package material 30' along a cutting line X-X to separate the winding capacitors 20 from each other. In addition, the carrier body 10' is cut or divided into a plurality of substrate bodies 10 (such as the carrier board) for respectively carrying or bearing the winding capacitors 20, and the package material 30' is cut or divided into a plurality of package bodies 30 to respectively enclose the winding bodies 200 of the winding capacitors 20. Moreover, each package body 30 has a first lateral surface 301 substantially flushed with the positive end surface 2010 of the corresponding winding capacitor 20 and a second lateral surface 302 opposite to the first lateral surface 301 and substantially flushed with the negative end surface 2020 of the corresponding winding capacitor 20.

Finally, referring to FIG. 1, FIG. 8 and FIG. 9, the step S120 is that: forming a positive electrode structure 41 to cover the first lateral surface 301 of the package body 30 and electrically contact the positive end surface 2010 of the positive conductive lead pin 201 and forming a negative electrode structure 42 to cover the second lateral surface 302 of the package body 30 and electrically contact the negative end surface 2020 of the negative conductive lead pin 202. More precisely, the positive electrode structure 41 can be extended from the first lateral surface 301 of the package body 30 to the top surface 300 of the package body 30 and the bottom surface 100 of the substrate body 10, and the negative electrode structure 42 can be extended from the second lateral surface 302 of the package body 30 to the top surface 300 of the package body 30 and the bottom surface 100 of the substrate body 10.

In conclusion, the instant disclosure provides a method of manufacturing a winding-type solid electrolytic capacitor package structure comprising the following steps: providing a plurality of winding capacitors; pressing the winding body of each winding capacitor from a cylinder into a cuboid; removing the negative soldering foot of each winding capacitor; soldering the positive soldering foot of each winding capacitor on a connection bar; processing the winding capacitors by a carbonization process, a formation process and a polymer-impregnated process in sequence; removing polymer that has been formed on an end portion of the negative conductive lead pin; removing the positive soldering foot of each winding capacitor; placing the winding capacitors on a carrier body; forming a package material on the carrier body to enclose the winding capacitors; cutting the carrier body and the package material, and then forming a positive electrode structure and a negative electrode structure to respectively cover the first and the second lateral surfaces.

Hence, the instant disclosure can provide a winding-type solid electrolytic capacitor package structure Z using a carrier board through the method from the step S100 to the step S120, comprising: a substrate unit 1, a capacitor unit 2, a package unit 3, an electrode unit 4 and an adhesion unit 5.

First, the substrate unit 1 includes a substrate body 10. The capacitor unit 2 includes at least one winding capacitor 20, and the winding capacitor 20 has a winding body 200, a positive conductive lead pin 201 extended from a first lateral side of the winding body 200, and a negative conductive lead pin 202 extended from a second lateral side of the winding body 200. More precisely, the positive conductive lead pin 201 has a positive end surface 2010 formed on the end thereof, and the negative conductive lead pin 202 has a negative end surface 2020 formed on the end thereof. In addition, the adhesion unit 5 includes at least one adhesive body 50, and the winding body 200 can be adhered to the top surface of the substrate body 10 through the adhesive body 50.

For example, referring to FIG. 3, the winding body 200 has a positive foil sheet 200A, a negative foil sheet 200B and an isolation paper 200C disposed between the positive foil sheet 200A and the negative foil sheet 200C, and the positive foil sheet 200A, the negative foil sheet 200B and the isolation paper 200C can be rolled and pressed to form a cuboid capacitor core. In addition, the positive conductive lead pin 201 and the negative conductive lead pin 202 can respectively electrically contact the positive foil sheet 200A and the negative foil sheet 200B. Moreover, the positive conductive lead pin 201 has a first positive conductive portion 2011 inserted into the winding body 200 and electrically contacting the positive foil sheet 200A and a second positive conductive portion 2012 integrally connected to the first positive conductive portion 2011 and extended and exposed from the winding body 200. And, the negative conductive lead pin 202 has a first negative conductive portion 2021 inserted into the winding body 200 and electrically contacting the negative foil sheet 200B and a second negative conductive portion 2022 integrally connected to the first negative conductive portion 2021 and extended and exposed from the winding body 200.

Moreover, the package unit 3 includes a package body 30 disposed on the substrate body 10 to enclose the winding body 200 of the winding capacitor 20, and the package body 30 has a first lateral surface 301 substantially flushed with the positive end surface 2010 and a second lateral surface 302 opposite to the first lateral surface 301 and substantially flushed with the negative end surface 2020. Furthermore, the electrode unit 4 includes a positive electrode structure 41 covering the first lateral surface 301 of the package body 30 and electrically contacting the positive end surface 2010 of the positive conductive lead pin 201 and a negative electrode structure 42 covering the second lateral surface 302 of the package body 30 and electrically contacting the negative end surface 2020 of the negative conductive lead pin 202. In addition, the positive electrode structure 41 can be extended from the first lateral surface 301 of the package body 30 to the top surface 300 of the package body 30 and the bottom surface 100 of the substrate body 10, and the negative electrode structure 42 can be extended from the second lateral surface 302 of the package body 30 to the top surface 300 of the package body 30 and the bottom surface 100 of the substrate body 10.

For example, the positive electrode structure 41 includes a first positive conductive layer 411 covering the first lateral surface 301 of the package body 30 and electrically contacting the positive end surface 2010 of the positive conductive lead pin 201, a second positive conductive layer 412 covering the first positive conductive layer 411, and a third positive conductive layer 413 covering the second positive conductive layer 412. And, the negative electrode structure 42 includes a first negative conductive layer 421 covering the second lateral surface 302 of the package body 30 and electrically contacting the negative end surface 2020 of the negative conductive lead pin 202, a second negative conductive layer 422 covering the first negative conductive layer 421, and a third negative conductive layer 423 covering the second negative conductive layer 422. More precisely, both the first positive conductive layer 411 and the first negative conductive layer 421 may be Ag (silver) layers, both the second positive conductive layer 412 and the second negative conductive layer 422 may be Ni (nickel) layers, and both the third positive conductive layer 413 and the third negative conductive layer 423 may be Sn layers.

In conclusion, the package body 30 has a first lateral surface 301 substantially flushed with the positive end surface 2010 and a second lateral surface 302 substantially flushed with the negative end surface 2020, and the electrode unit 4 includes a positive electrode structure 41 for covering the first lateral surface 301 and a negative electrode structure 42 for covering the second lateral surface 302, thus the instant disclosure can be manufactured without using any lead frame for decreasing the manufacturing cost and increasing the manufacturing speed (i.e., the production quantity) and the production yield rate.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A winding-type solid electrolytic capacitor package structure using a carrier board, comprising:
   a substrate unit including a substrate body;
   a capacitor unit including at least one winding capacitor, wherein the at least one winding capacitor has a winding body, a positive conductive lead pin extended from a first lateral side of the winding body, and a negative conductive lead pin extended from a second lateral side of the winding body, the positive conductive lead pin has a positive end surface, and the negative conductive lead pin has a negative end surface;

a package unit including a package body disposed on the substrate body to enclose the winding body, wherein the package body has a first lateral surface substantially flushed with the positive end surface and a second lateral surface opposite to the first lateral surface and substantially flushed with the negative end surface; and an electrode unit including a positive electrode structure covering the first lateral surface of the package body and electrically contacting the positive end surface of the positive conductive lead pin and a negative electrode structure covering the second lateral surface of the package body and electrically contacting the negative end surface of the negative conductive lead pin.

2. The winding-type solid electrolytic capacitor package structure of claim 1, further comprising: an adhesion unit including at least one adhesive body, wherein the winding body is adhered to the top surface of the substrate body through the at least one adhesive body.

3. The winding-type solid electrolytic capacitor package structure of claim 1, wherein the winding body has a positive foil sheet, a negative foil sheet and an isolation paper disposed between the positive foil sheet and the negative foil sheet, the positive foil sheet, the negative foil sheet and the isolation paper are rolled to form a cuboid capacitor core, and the positive conductive lead pin and the negative conductive lead pin respectively electrically contact the positive foil sheet and the negative foil sheet.

4. The winding-type solid electrolytic capacitor package structure of claim 3, wherein the positive conductive lead pin has a first positive conductive portion inserted into the winding body and electrically contacting the positive foil sheet and a second positive conductive portion connected to the first positive conductive portion and extended and exposed from the winding body, and the negative conductive lead pin has a first negative conductive portion inserted into the winding body and electrically contacting the negative foil sheet and a second negative conductive portion connected to the first negative conductive portion and extended and exposed from the winding body.

5. The winding-type solid electrolytic capacitor package structure of claim 1, wherein the positive electrode structure is extended from the first lateral surface of the package body to the top surface of the package body and the bottom surface of the substrate body, and the negative electrode structure is extended from the second lateral surface of the package body to the top surface of the package body and the bottom surface of the substrate body.

6. The winding-type solid electrolytic capacitor package structure of claim 1, wherein the positive electrode structure includes a first positive conductive layer covering the first lateral surface of the package body and electrically contacting the positive end surface of the positive conductive lead pin, a second positive conductive layer covering the first positive conductive layer, and a third positive conductive layer covering the second positive conductive layer, wherein the negative electrode structure includes a first negative conductive layer covering the second lateral surface of the package body and electrically contacting the negative end surface of the negative conductive lead pin, a second negative conductive layer covering the first negative conductive layer, and a third negative conductive layer covering the second negative conductive layer, wherein both the first positive conductive layer and the first negative conductive layer are Ag layers, both the second positive conductive layer and the second negative conductive layer are Ni layers, and both the third positive conductive layer and the third negative conductive layer are Sn layers.

7. A method of manufacturing a winding-type solid electrolytic capacitor package structure using a carrier board, comprising:

providing a carrier body;

placing a plurality of winding capacitors on the carrier body, wherein each winding capacitor has a winding body, a positive conductive lead pin extended from a first lateral side of the winding body, and a negative conductive lead pin extended from a second lateral side of the winding body, the positive conductive lead pin of each winding capacitor has a positive end surface, and the negative conductive lead pin of each winding capacitor has a negative end surface;

forming a package material on the carrier body to enclose the winding capacitors;

cutting the carrier body and the package material to separate the winding capacitors from each other, wherein the carrier body is cut into a plurality of substrate bodies for respectively carrying the winding capacitors, the package material is cut into a plurality of package bodies to respectively enclose the winding bodies of the winding capacitors, and each package body has a first lateral surface substantially flushed with the positive end surface of the corresponding winding capacitor and a second lateral surface opposite to the first lateral surface and substantially flushed with the negative end surface of the corresponding winding capacitor; and forming a positive electrode structure to cover the first lateral surface of the package body and electrically contact the positive end surface of the positive conductive lead pin and forming a negative electrode structure to cover the second lateral surface of the package body and electrically contact the negative end surface of the negative conductive lead pin.

8. The method of claim 7, wherein before the step of placing the winding capacitors on the carrier body, the method further comprises:

pressing the winding body of each winding capacitor from a cylinder into a cuboid, wherein each winding capacitor includes a positive soldering foot soldered on an end of the positive conductive lead pin and a negative soldering foot soldered on an end of the negative conductive lead pin;

removing the negative soldering foot of each winding capacitor by cutting;

soldering the positive soldering foot of each winding capacitor on a connection bar;

processing the winding capacitors by a carbonization process, a formation process and a polymer-impregnated process in sequence;

removing polymer that has been formed on an end portion of the negative conductive lead pin of each winding capacitor; and removing the positive soldering foot of each winding capacitor by cutting.

9. The method of claim 7, wherein the winding body of each winding capacitor is adhered to the top surface of the carrier body through at least one adhesive body in the step of placing the winding capacitors on the carrier body.

10. The method of claim 7, wherein the winding body has a positive foil sheet, a negative foil sheet and an isolation paper disposed between the positive foil sheet and the negative foil sheet, the positive foil sheet, the negative foil sheet and the isolation paper are rolled to form a cuboid capacitor core, and the positive conductive lead pin and the negative conductive lead pin respectively electrically contact the positive foil sheet and the negative foil sheet.

11. The method of claim 10, wherein the positive conductive lead pin has a first positive conductive portion inserted into the winding body and electrically contacting the positive foil sheet and a second positive conductive portion connected to the first positive conductive portion and extended and exposed from the winding body, and the negative conductive lead pin has a first negative conductive portion inserted into the winding body and electrically contacting the negative foil sheet and a second negative conductive portion connected to the first negative conductive portion and extended and exposed from the winding body, wherein the positive electrode structure is extended from the first lateral surface of the package body to the top surface of the package body and the bottom surface of the substrate body, and the negative electrode structure is extended from the second lateral surface of the package body to the top surface of the package body and the bottom surface of the substrate body.

12. The method of claim 7, wherein the positive electrode structure includes a first positive conductive layer covering the first lateral surface of the package body and electrically contacting the positive end surface of the positive conductive lead pin, a second positive conductive layer covering the first positive conductive layer, and a third positive conductive layer covering the second positive conductive layer, wherein the negative electrode structure includes a first negative conductive layer covering the second lateral surface of the package body and electrically contacting the negative end surface of the negative conductive lead pin, a second negative conductive layer covering the first negative conductive layer, and a third negative conductive layer covering the second negative conductive layer, wherein both the first positive conductive layer and the first negative conductive layer are Ag layers, both the second positive conductive layer and the second negative conductive layer are Ni layers, and both the third positive conductive layer and the third negative conductive layer are Sn layers.

\* \* \* \* \*